United States Patent [19]
Eckhoff et al.

[11] Patent Number: 5,896,370
[45] Date of Patent: Apr. 20, 1999

[54] SIGNAL PROTECTION AND MONITORING SYSTEM

[75] Inventors: Charles C. Eckhoff; Oscar A. Tovar, both of Plano, Tex.

[73] Assignee: Alcatel USA, Inc., Plano, Tex.

[*] Notice: This patent is subject to a terminal disclaimer.

[21] Appl. No.: 08/748,202

[22] Filed: Nov. 12, 1996

Related U.S. Application Data

[63] Continuation of application No. 08/270,019, Jul. 1, 1994, Pat. No. 5,574,718.

[51] Int. Cl.$^6$ ............................................. H04J 3/14
[52] U.S. Cl. ........................ 370/228; 370/219; 370/220; 370/224; 395/182.11
[58] Field of Search ............................ 370/216, 217, 370/218, 219, 220, 221, 224, 225, 226, 227, 228, 352; 371/10.2, 40.11, 40.12, 40.13, 40.14; 395/200.38, 182.11, 182.08, 182.09

[56] References Cited

U.S. PATENT DOCUMENTS

| | | | |
|---|---|---|---|
| 4,435,803 | 3/1984 | Das et al. ......................... | 370/228 |
| 5,010,550 | 4/1991 | Hirata .............................. | 370/228 |
| 5,436,890 | 7/1995 | Read et al. ...................... | 370/352 |
| 5,448,572 | 9/1995 | Knox et al. ..................... | 370/228 |
| 5,574,718 | 11/1996 | Eckhoff et al. ................. | 370/228 |
| 5,581,542 | 12/1996 | Kato et al. ...................... | 370/228 |

*Primary Examiner*—Douglas W. Olms
*Assistant Examiner*—Shick Hom
*Attorney, Agent, or Firm*—Baker & Botts, L.L.P.

[57] ABSTRACT

A redundancy switch (44) provides interfacing of network signals to spare network processors (46) in the event of a failure of a main network processor (42). A redundancy switch (44) allows for monitoring and diagnostic operations to be performed on network electrical signals without interrupting traffic flow on inbound and outbound paths. A redundancy switch (44) performs a loopback diagnostic by routing signals from transmitter portions of the spare network processors (46) to selected receiver portions. The redundancy switch (44) includes a receiver interface unit (90) and a transmitter interface unit (92) capable of routing inbound and outbound customer signals to and from the spare processors (46) for monitoring, diagnostic, and sparing purposes.

15 Claims, 4 Drawing Sheets

SIGNAL PROTECTION AND MONITORING SYSTEM

CROSS REFERENCE TO RELATED APPLICATIONS

This application is a continuation application of U.S. application Ser. No. 08/270,019, filed Jul. 1, 1994 and entitled "Signal Protection and Monitoring System," by Charles C. Eckhoff and Oscar A. Tovar, now U.S. Pat. No. 5,574,718, issued Nov. 12, 1996.

TECHNICAL FIELD OF THE INVENTION

The present invention relates in general to telecommunication networks and more, particularly to a signal protection and monitoring system.

BACKGROUND OF THE INVENTION

Equipment within telecommunication networks provide redundant or sparing techniques to ensure that information is transferred despite a failure in any other part of the equipment. Typically, telecommunication devices receive signal information at a splitter that provides outputs to a primary signal path and a spare signal path. A splitter is an analog passive device that generates two copies of a signal having a lower amplitude and similar impedance as the original signal. The splitter receives a control signal that determines which transmission path will carry the input signal information. Signal information is carried over the primary transmission path unless a failure occurs along the primary transmission path. Alternatives to a splitter include a router, a relay, or a switch.

When a failure is detected, the splitter routes the signal information to the spare transmission path in response to the control signal. However, the splitter and its alternatives are not a very reliable approach in that there is access to only one path and a break or an interruption of the input signal information occurs when switching from one signal path to another. Monitoring of the actual signal being received by a telecommunications device is difficult in a splitter environment and testing cannot be performed on the actual input signal information being received by the telecommunications device. Therefore, it is desirable to have a sparing technique that does not cause a break in the transmission path of the signal information being received.

From the foregoing, it may be appreciated that a need has arisen for a sparing technique that does not interrupt the transmission path of the incoming signal. A need has also arisen for a sparing technique that allows for monitoring of the actual signal being received. Further, a need has arisen for a sparing technique that can perform diagnostic operations on the actual signal being received.

SUMMARY OF THE INVENTION

In accordance with the present invention, a signal protection and monitoring system is provided which substantially eliminates or reduces disadvantages and problems associated with prior telecommunication sparing techniques.

According to an embodiment of the present invention, there is provided a signal protection system that includes a main processor operable to receive an inbound customer signal on an inbound transmission path and generate an outbound customer signal on an outbound transmission path. A redundancy switch is also capable of receiving the inbound customer signal from the inbound transmission path and said outbound customer signal on said outbound transmission path for monitoring purposes. Upon indication of a failure of the main processor, a spare processor receives the inbound customer signal from the inbound transmission path through the redundancy switch and generates an outbound customer signal for transmission through the redundancy switch and onto the outbound transmission path. The redundancy switch allows for monitoring of the inbound and outbound customer signals and is capable of performing diagnostic evaluations on the signals.

The present invention provides numerous technical advantages over prior telecommunication sparing techniques. One technical advantage is in placing the spare processor onto the inbound and outbound transmission paths in the event of a failure of the main processor. Another technical advantage is in the capability of performing a monitoring function on the actual inbound customer signal received on the inbound transmission path and of the actual outbound customer signal placed on the outbound transmission path. Yet another technical advantage is in performing diagnostic operations on the inbound and outbound customer signals to verify the integrity of the signals for fault isolation purposes. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
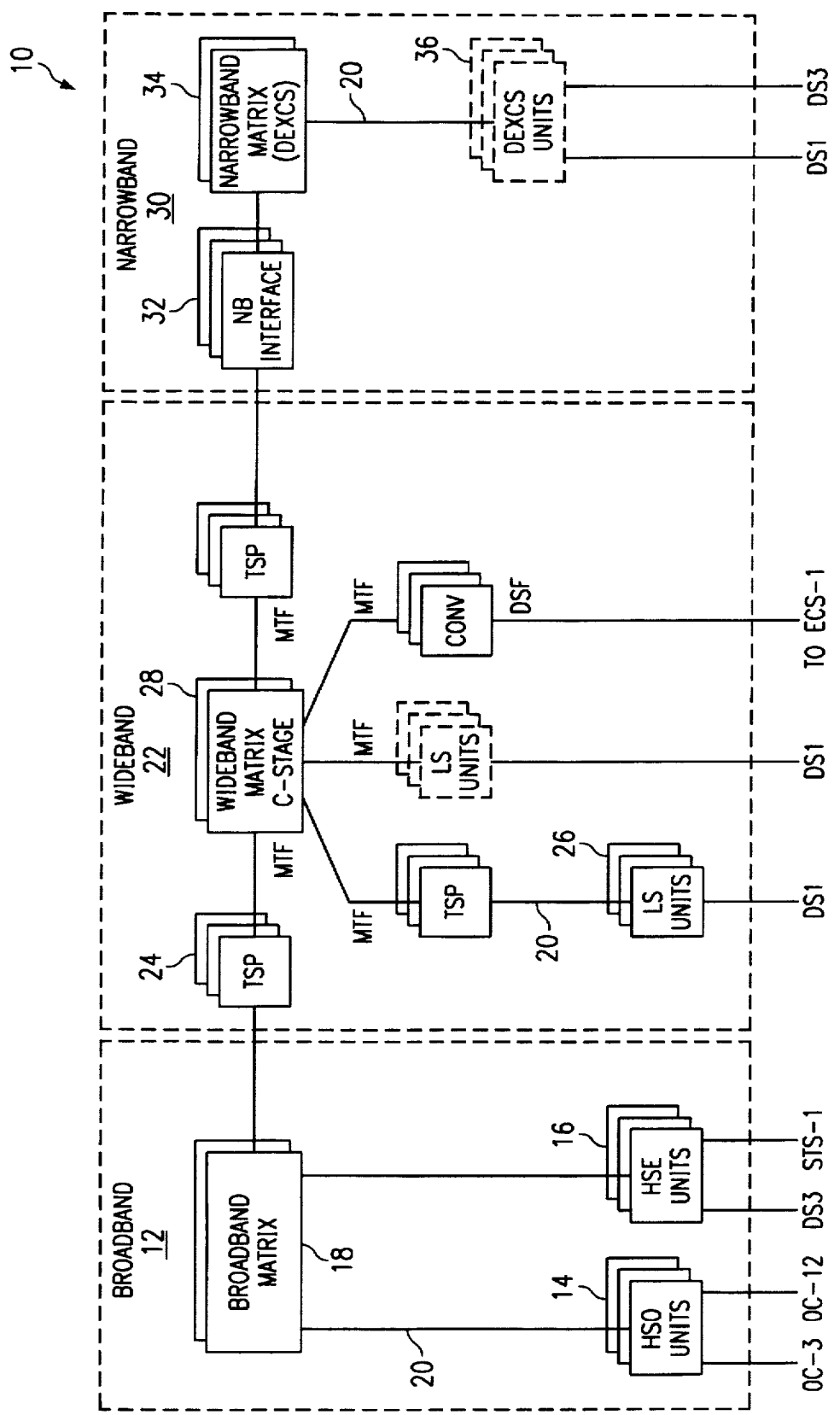
FIG. 1 is a block diagram of an integrated multi-rate cross-connect system.

FIG. 1 is a block diagram of an integrated multi-rate cross-connect system 10. Integrated multi-rate cross-connect system 10 includes a broadband subsystem 12 having high speed optical units 14, high speed electrical units 16, and a broadband matrix 18. High speed optical units 14 interface with broadband matrix 18 over an internal transmission link 20 for routing of network optical signals. High speed electrical units 16 interface with broadband matrix 18 over internal transmission link 20 for routing of network electrical signals. Broadband matrix 18 cross-connects signals back to the network through high speed optical units 14 or high speed electrical unit 16 or through a wideband subsystem 22.

Integrated multi-rate cross-connect system 10 also includes a wideband subsystem 22 that has a plurality of tributary signal processing subsystems 24, low speed electrical units 26, and a wideband matrix center stage 28. Low speed electrical units 26 interface with a tributary signal processing subsystem 24 over an internal transmission link 20 for routing network electrical signals. Tributary signal processing subsystems 24 interface with broadband subsystem 12, a narrowband subsystem 30, and the network to convert signal information into a proprietary format for cross-connection through wideband matrix center stage 28.

Integrated multi-rate cross-connect system 10 also includes a narrowband subsystem 30 that has a narrowband interface 32, a narrowband matrix 34, and a switching unit 36. Switching unit 36 interfaces with narrowband matrix 34 over internal transmission link 20 for routing of lower rate network electrical signals. Narrowband interface 32 provides a link between a tributary signal processing subsystem 24 of wideband subsystem 22 and narrowband matrix 34. Broadband subsystem 12, wideband subsystem 22, and narrowband subsystem 30 are all under control of an administration subsystem (not shown).

For more information on the functions and operations of each component within integrated multi-rate cross-connect system, please refer to co-pending U.S. Pat. application Ser. No. 08/176,548, entitled "Integrated Multi-Rate Cross-connect System", commonly assigned with the present application, and hereby incorporated by reference herein. Discussion will now be focussed on the function and operation of high speed electrical unit 16.

Figure 2:
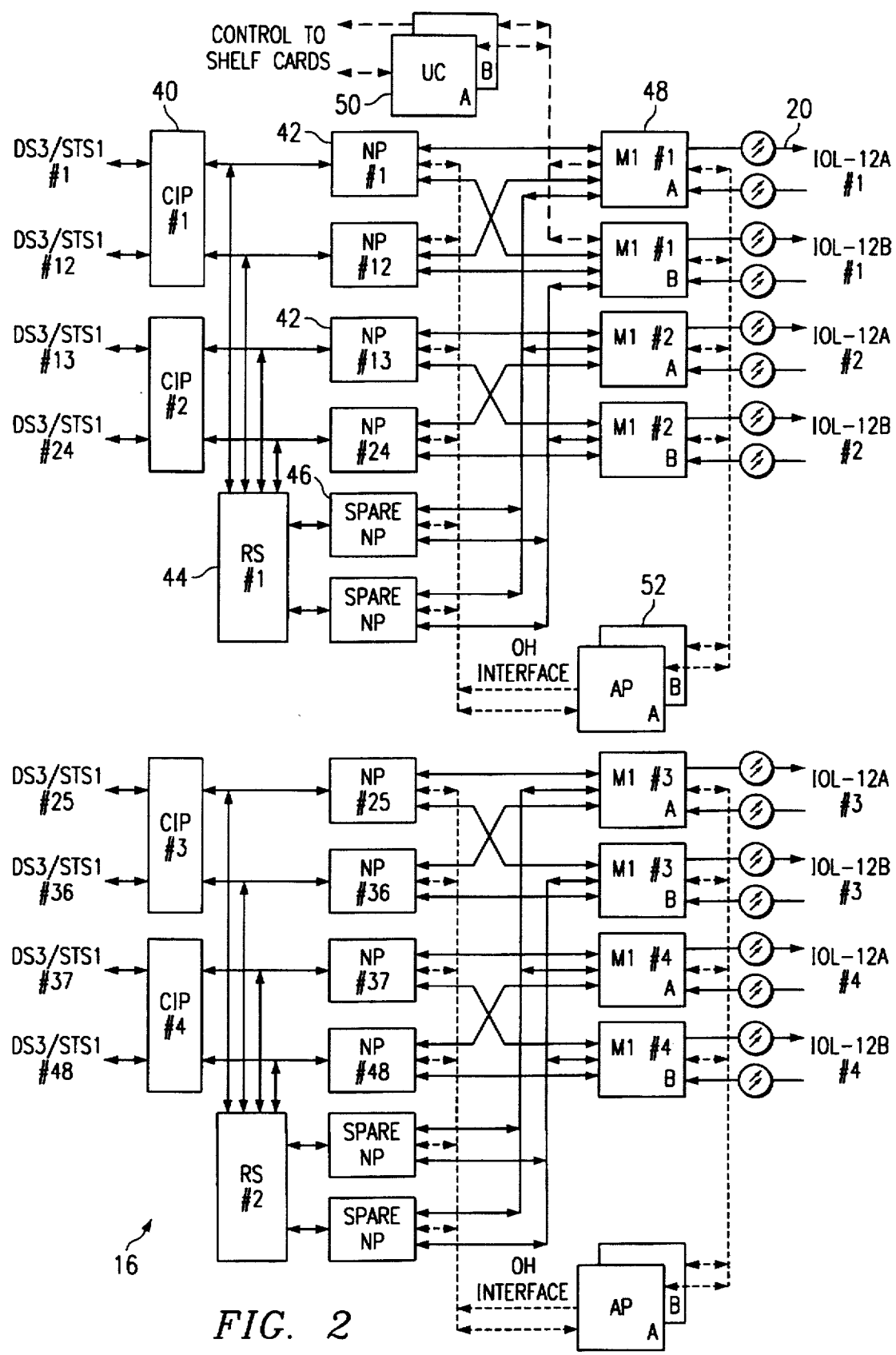
FIG. 2 is a block diagram of a high speed electrical unit within the integrated multi-rate cross-connect system.

FIG. 2 is a block diagram of high speed electrical unit 16. High speed electrical unit 16 includes customer interface panels 40, each receiving and transmitting (preferably twelve) network DS3 or STS-1 electrical signals or a mixture thereof. Customer interface panel 40 routes the network electrical signals to and from one of a plurality of network processors 42, wherein each network processor 42 receives a separate network electrical signal. Each network processor 42 handles one of the DS3 or STS-1 type of electrical signals. Customer interface panel 40 also routes network signals to a redundancy switch 44. Redundancy switch 44 selectively routes network electrical signals to one of two spare network processors 46. In the preferred embodiment, there is one spare network processor 46 for every twelve network processors 42.

Of the two spare network processors 46 shown, preferably one is dedicated to DS3 electrical signals and the other is dedicated to STS-1 electrical signals. For inbound traffic, network processors 42 (and spare network processors 46 as required) place the network electrical signals into appropriate proprietary formats for transmission to redundant matrix interfaces 48. For outbound traffic, network processors 42 (and spare network processors 46 as required) convert signals received from matrix interfaces 48 in the proprietary format into appropriate network electrical signals for transmission to the network through customer interface panel 40.

Matrix interfaces 48 multiplex inbound signals from network processors 42 (and spare network processors 46 as required) for transmission over internal transmission link 20. Matrix interfaces 48 also demultiplex outbound signals from internal transmission link 20 for transmission to separate network processors 42. Preferably, each matrix interface 48 multiplexes twelve proprietary signal formats from twelve separate network processors 42 (or from one of the two spare network processors 46 as required) for placement onto internal transmission link 20. In the outbound direction, matrix interfaces 48 demultiplex proprietary signal formats from internal transmission link 20 into twelve separate proprietary signal formats for placement onto each network processor 42 (or spare network processor 46 as required). Redundant unit controllers 50 handle control for high speed electrical unit 16. Attached processors 52 are included to process SONET and DS3 overhead and are able to insert and extract applicable overhead in internal transmission link 20.

For inbound operation of high speed electrical unit 16, customer interface panels 40 provide BNC connector interfaces to preferably forty-eight network electrical signals at the DS3 and/or STS-1 rate. Customer interface panel 40 connects the DS3 and/or STS-1 network electrical signals to network processors 42 and redundancy switch 44. Each network processor 42 receives a separate DS3 or STS-1 network electrical signal for termination and placement into a proprietary STS-1P format. Proprietary STS-1P signals from twelve of the network processors 42 are sent to a first pair of redundant matrix interfaces 48.

Matrix interfaces 48 multiplex the proprietary STS-1P signals into a multiplex STS-12P signal for transmission over internal transmission link 20. Internal transmission link 20 interfaces high speed electrical unit 16 to broadband matrix 18 and carries system data, DS3 overhead, SONET overhead, proprietary overhead, timing, control, and status information.

Redundancy switch 44 and spare network processors 46 provide equipment protection interface for high speed electrical unit 16. In each half of high speed electrical unit 16, one spare network processor 46 is dedicated to DS3 protection and the other spare network processor 46 is dedicated to STS-1 protection. Each redundancy switch 44 has access to twenty-four of the network electrical signals and may select any one of these signals to be sent to one of the two spare network processors 46. Therefore, the overall protection scheme for each half of high speed electrical unit 16 has a ratio of 1:24.

In the outbound direction, matrix interfaces 48 demultiplex the multiplexed STS-12P signal from internal transmission link 20 and distribute twelve discrete electrical proprietary STS-1P signals to network processors 42. Network processors 42 terminate the respective proprietary STS-1P signals and either remove the DS3 signal from the STS synchronous payload envelope or leave the proprietary STS-1P signal intact and remove the proprietary overhead and replace it with SONET compatible overhead. By having redundant matrix interfaces 48, matrix plane independence is maintained from the matrix to the network processors 42. This allows for the network processors 42 to monitor both planes and select the most reliable path. Matrix interfaces 48 also distribute proprietary STS-1P signals to spare network processors 46 as required for appropriate protection processing.

Control for high speed electrical unit 16 is handled by redundant unit controllers 50. Unit controllers 50 distribute control links to all network processors 42, matrix interfaces 48, redundancy switches 44, and attached processors 52. Control from the administration subsystem is passed to high speed electrical unit 16 through matrix interfaces 48 and internal transmission links 20. This control information is extracted from internal transmission link 20 overhead of the first pair of matrix interfaces 48 and sent to unit controllers 50. Unit controllers 50 interpret the control packet and determine which subordinate cards to control. Unit controller 50 uses these same interfaces to report status back to the administration subsystem.

Redundant attached processors 52 are responsible for processing overhead within high speed electrical unit 16. Under unit controller 50 control, attached processors 52 provide serial overhead interfaces to all network processors 42. Overhead that is not processed on network processors 42 is sent to attached processors 52 where it is multiplexed into internal transmission link 20 via matrix interfaces 48.

Figure 3:
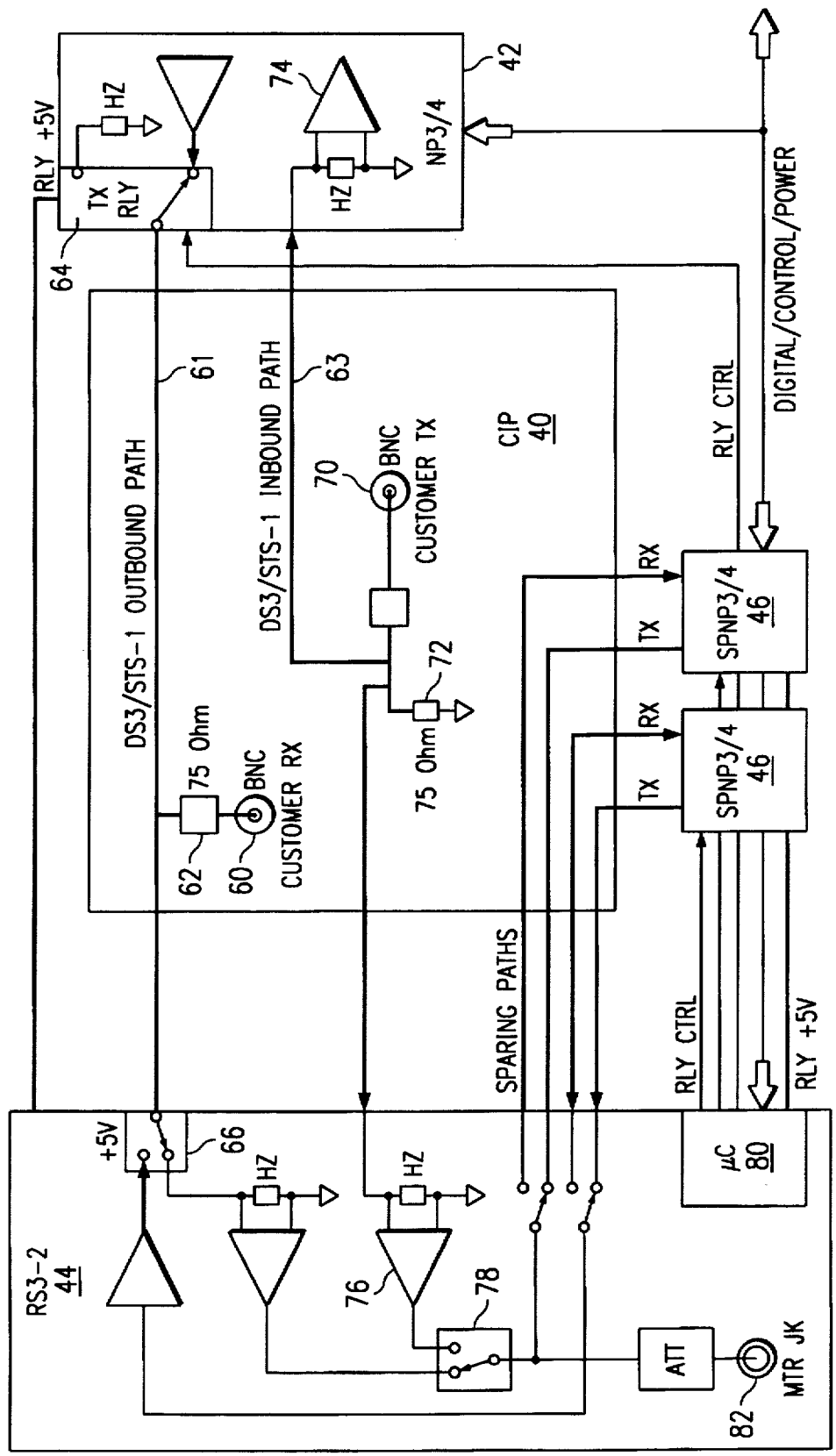
FIG. 3 is a block diagram of a high level application of a redundancy switch within the high speed electrical unit.

FIG. 3 shows a high level application for redundancy switch 44. Redundancy switch 44 places spare network processors 46 into the inbound and outbound paths on customer interface panel 40 from and to the network.

respectively, for processing the actual network electrical signals in the case of a failure of one of the main network processors 42.

In the outbound direction to the network, the outbound path is a transmission line 61 that connects an output of network processor 42 to a Customer Out BNC connector 60 terminated on a 75 Ohm unbalanced load 62. Transmission line 61 is tapped on the customer interface panel 40 to connect an output of redundancy switch 44 to Customer Out BNC connector 60 in the event of a failure of network processor 42. During non-failure operation, a relay 64 is set to allow network processor 42 to output network signals on the outbound path to the network through Customer Out BNC connector 60. A relay 66 is set on redundancy switch 44 to allow for monitoring of the network signal on the outbound path.

In the event of a failure, relay 64 switches to prevent network processor 42 from outputting network electrical signals onto the outbound path. Relay 66 switches to allow network electrical signals to be placed on the outbound path from one of spare network processors 46 through redundancy switch 44. The elected spare network processor 46 takes the place of the failed network processor 42 by providing appropriate network signals on the outbound path through redundancy switch 44.

In the inbound direction from the network, network electrical signals are received on an inbound path from a transmission line 63 that joins a Customer In BNC connector 70 and a 75 Ohm termination load 72 of customer interface panel 40. Transmission line 63 is tapped in two places, one for connecting to a very high input impedance receiver 74 on network processor 42 and two for connecting to a very high input impedance receiver 76 on redundancy switch 44.

During normal operation, receiver 74 of network processor 42 is active and receiver 76 of redundancy switch 44 is in standby through disconnection of relay switch 78. In the event of a failure, relay switch 78 places receiver 76 in the active mode to allow for network electrical signals on the inbound path to be routed to one of the spare network processors 46. When receiver 76 is in the active mode, inbound network electrical signals received at receiver 74 are ignored.

A microcontroller unit 80 locally performs all the activities of supervision and control of redundancy switch 44. Microcontroller unit 80 is subordinate to unit controller 50. Redundancy switch 44 also includes a monitor jack 82 to monitor an analog buffered waveform of a network electrical signal available at one of the inbound or outbound connectors on customer interface panel 40. The monitor function of redundancy switch 44 provides for bridged access to the analog inbound and outbound signals from the primary network processors 42. This capability is used to test the integrity of the data to and from the network processors 42 and is available when sparing is not required.

The structure of redundancy switch 44 is designed to facilitate fault isolations on the outbound and inbound signal paths without interrupting the main traffic flow. Self checking and isolation of defective components is also performed by redundancy switch 44. Redundancy switch 44 verifies inbound path and digital signal integrity without interrupting the primary signal path. The outbound path and digital signal integrity can also be verified without interrupting the main traffic flow. Inbound and outbound paths can be verified internally for isolation of defective components. The integrity of spare network processors 46 can also be verified.

Figure 4:
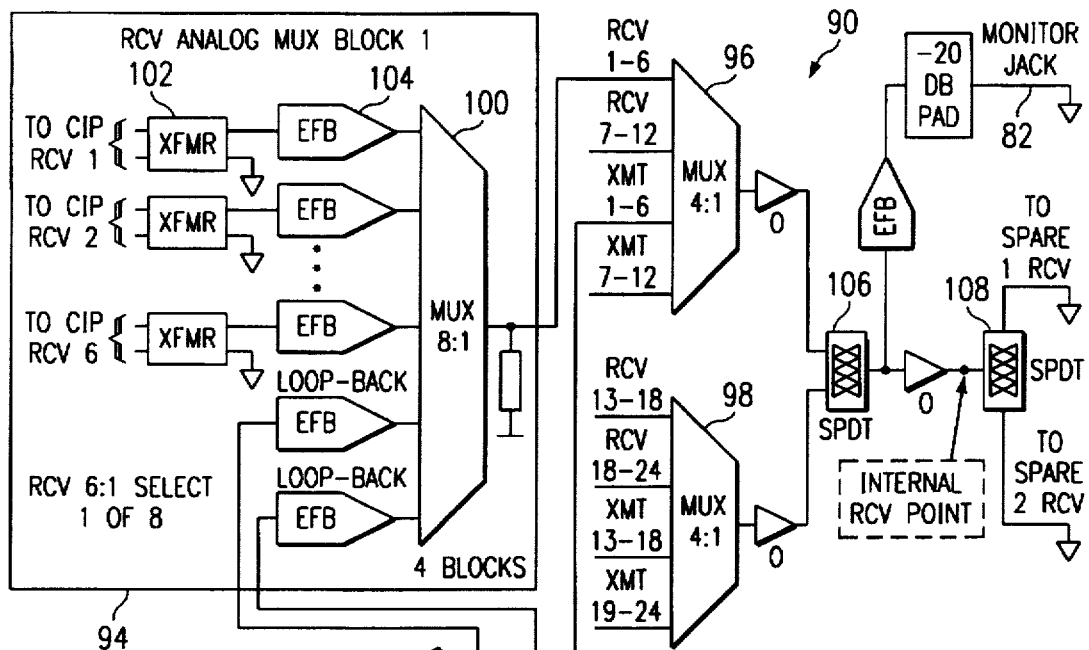
FIG. 4 is a block diagram of the redundancy switch.
Figure 4:
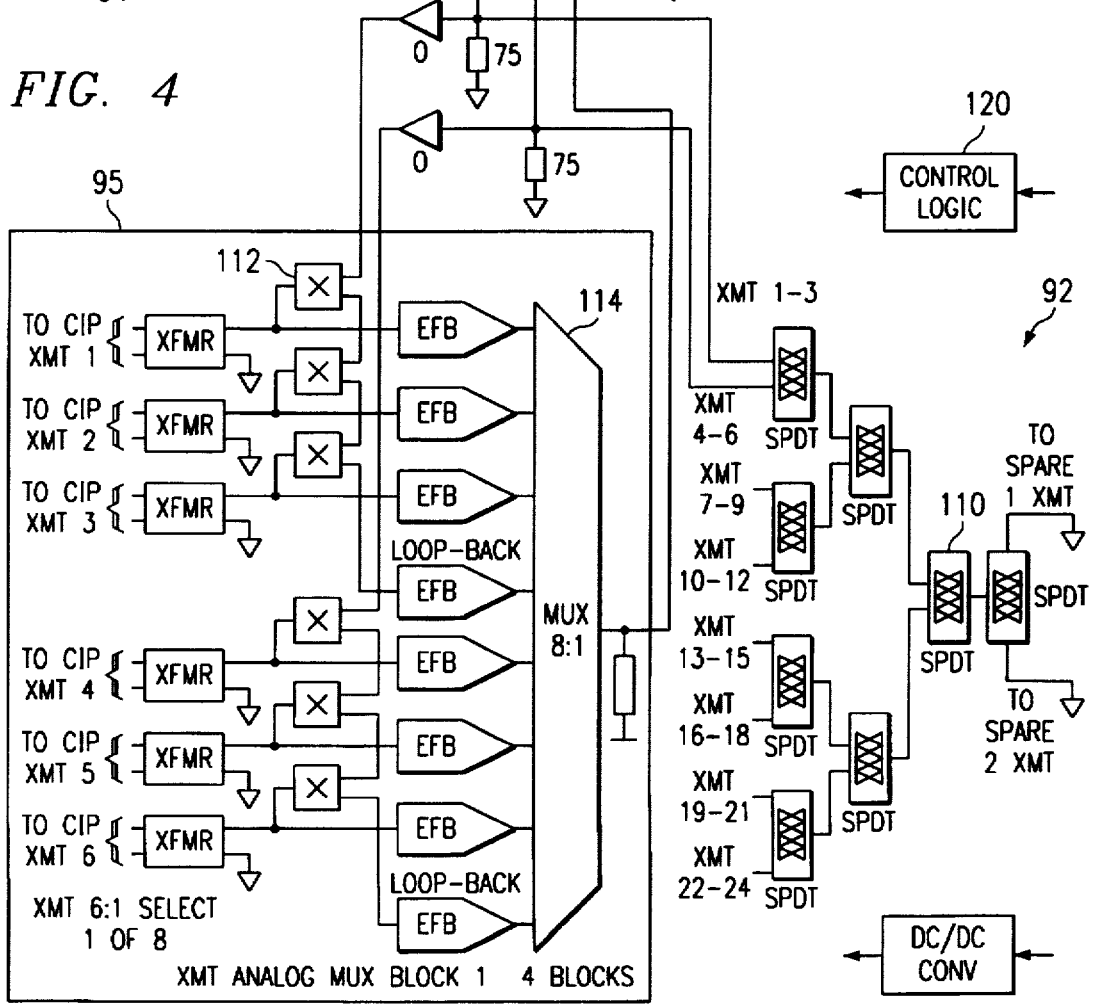

FIG. 4 is a block diagram of redundancy switch 44. Redundancy switch 44 includes a receiver interface 90 and a transmitter interface 92. Receiver interface 90 bridges across twenty-four Customer In BNC connectors 70 of customer interface panel 40 and selects a single Customer In BNC connector signal for placement onto the selected spare receive circuit. The twenty-four Customer In BNC connectors 70, representing twenty-four separate inbound transmission paths, are divided into four groups of six connectors each. Each group of six inbound transmission paths are associated to one of four receive analog mux blocks 94. The four receive analog mux blocks 94 are further multiplexed by multiplexers 96 and 98 to provide a single signal which is buffered to monitor jack 82 and spare network processors 46.

One of the four receive analog mux blocks 94 provides selection between six inbound transmission paths and two diagnostic ports. Six inbound transmission paths from corresponding Customer In BNC connectors 70 form six of the inputs to an analog 8:1 multiplexer 100. The seventh and eighth inputs are from emitter follower buffer (EFB) amplifier outputs and are used for diagnostic purposes.

The signal path for a network electrical signal proceeds from a Customer In BNC connector 70 to a transformer 102, an EFB amplifier 104, and multiplexer 100. Transformer 102 is used to isolate connector ground from logic ground. EFB amplifier 104 provides impedance conversion and presents a high impedance towards the Customer In BNC connector 70 and a low impedance towards multiplexer 100. Multiplexer 100 selects one of the EFB amplifier outputs to be further multiplexed.

The output of receive analog mux block 94 at multiplexer 100 connects to multiplexer 96 that also receives the outputs of the corresponding transmit signals for monitoring purposes. Multiplexer 98 provides similar connections for the remaining receive analog mux blocks 94. Multiplexers 96 and 98 feed a single pole double throw switch 106 to reach a single internal point to which the twenty-four signals from respective Customer In connectors converge. This internal receive point is routed to monitor jack 82 and to one of two spare network processors 46 as determined by switch 108. In this manner, redundancy switch 44 provides monitoring capability of network electrical signals on both the inbound and outbound transmission paths.

Monitoring for transmitter interface 92 is identical to that of receiver interface 90. Transmitter interface 92 bridges across twenty-four Customer Out BNC connectors 60 of customer interface panel 40 and selects a single Customer Out BNC connector signal for placement onto the selected spare receive circuitry. The twenty-four Customer Out BNC connectors, representing twenty-four separate outbound transmission paths, are divided into four groups of six connectors each. These groups are wired-or'ed in the same fashion and buffered to the same single internal point as the receive signals in receiver interface 90. This portion of transmitter interface 92 is used for transmit monitoring and diagnostics only.

Transmitter interface 92 provides a separate path for sparing which connects one of the two spare network processors 46 to an appropriate Customer Out BNC connector 60. A relay tree is formed through a plurality of single pole double throw switches 110 for selection of one of spare network processors 46 and routes it to one of eight groups of three outbound relays 112. Each relay is associated with one Customer Out BNC connector 60 on customer interface panel 40. Only one of the three interfacing relay contacts 112 will be active at a time to complete the transmit sparing path through the isolating transformer.

Redundancy switch 44 performs two types of diagnostic operations, loopback and monitor. A loopback diagnostic allows the signal to be routed from the transmitter portion of either spare network processor 46 to the receive portion of either spare network processor 46. The outbound signal passes through the relay tree of switches 110 and can be looped back either at the seventh or eighth inputs of multiplexer 100 of receive analog mux block 94 or through multiplexer 114 of transmit analog mux block 95. Loopback through transmit analog mux block 95 include relays 112 whose status can be checked.

The monitor function allows a signal on the inbound or outbound path from customer In connectors or Customer Out connectors respectively to be connected to either spare network processors 46 and to monitoring jack 82. The monitoring function can be effectuated even with the main network processor 42 active. The monitor jack output signal level is approximately 20 dB lower than the level applied to the selected spare network processor 46. Preferably, the loopback and transmit monitor functions cannot be performed during sparing because receiver interface 90 of redundancy switch 44 is internally dedicated to the spare receive path. Control logic 120 drive the switches and multiplexers of redundancy switch 44 under the control of microcontroller unit 80.

In summary, a redundancy switch provides sparing, monitoring, and diagnostic operations on network electrical signals without breaking or switching the network signals from a primary transmission path. The redundancy switch allows for signal verification and integrity checks without interrupting the traffic flow of the signals.

Thus, it is apparent that there has been provided, in accordance with the present invention, a signal protection system that satisfies the advantages set forth above. Although the preferred embodiment has been described in detail, it should be understood that various changes, substitutions, and alterations can be made herein. For example, though interfacing is shown with a specific number of signals, any number of signals can be incorporated into the protection scheme. Further, though specific switches and selection devices are shown, routing and selection of signals can be done in a variety of ways known in the art. Other examples are readily ascertainable by one skilled in the art and could be made without departing from the spirit and scope of the present invention as defined by the following claims.

What is claimed is:

1. A redundancy switch for interfacing with network electrical signals, comprising:
   a receiver interface unit operable to receive network electrical signals over a plurality of inbound transmission paths each coupled to separate network processors, the receiver interface unit operable to couple any one of the plurality of inbound transmission paths to a spare processor for monitoring purposes and in response to a failure in a corresponding separate network processor.

2. The redundancy switch of claim 1, wherein the receiver interface unit is operable to receive a plurality of outbound transmission paths each coupled to separate network processors, the receiver interface unit operable to couple one of the plurality of outbound transmission paths to the spare processor for monitoring purposes.

3. The redundancy switch of claim 2, further comprising:
   a transmitter interface unit operable to provide the plurality of outbound transmission paths each coupled to separate network processors, the transmitter interface unit operable to couple the spare processor to one of the plurality of outbound transmission paths in order to transmit network electrical signals upon a failure in a corresponding network processor.

4. A redundancy switch for interfacing with network electrical signals, comprising:
   a receiver interface unit operable to receive network electrical signals over a plurality of inbound transmission paths each coupled to separate network processors, the receiver interface unit operable to couple any one of the plurality of inbound transmission paths to a spare processor for monitoring purposes and in response to a failure in a corresponding separate network processor, wherein the receiver interface unit is operable to receive a plurality of outbound transmission paths each coupled to separate network processors, the receiver interface unit operable to couple one of the plurality of outbound transmission paths to the spare processor for monitoring purposes;
   a transmitter interface unit operable to provide the plurality of outbound transmission paths each coupled to separate network processors, the transmitter interface unit operable to couple the spare processor to one of the plurality of outbound transmission paths in order to transmit network electrical signals upon a failure in a corresponding network processor, wherein a signal from the spare processor coupled to one of the plurality of outbound transmission paths may be looped back to the spare processor through the receiver interface unit.

5. A method of signal protection and monitoring, comprising steps of:
   receiving an inbound customer signal at a first processor from an inbound transmission path;
   generating an outbound customer signal at the first processor onto an outbound transmission path;
   monitoring the inbound and outbound customer signals;
   detecting a failure in the first processor in response to the monitoring step;
   routing the inbound customer signal to a second processor in response to the detecting step;
   generating outbound customer signal at the second processor in response to the detecting step.

6. The method of claim 5, further comprising a step of:
   routing the outbound customer signal generated at the first processor to the second processor in order to perform self diagnostic testing.

7. The method of claim 5, further comprising a step of:
   removing the outbound customer signal generated by the first processor from the outbound transmission path in response to the detecting step.

8. The method of claim 5, further comprising a step of:
   coupling the second processor to the inbound and outbound transmission paths in response to the detecting step.

9. A method of signal protection and monitoring, comprising steps of:
   receiving an inbound customer signal from an inbound transmission path destined for a main processor;
   receiving an indication of a failure in the main processor;
   selecting a spare processor in response to the indication;
   routing the inbound customer signal to the spare processor in response to the indication;
   placing a spare outbound customer signal generated by the spare processor onto the outbound transmission path in response to the indication.

10. The method of claim 9, further comprising a step of:
   removing the main outbound customer signal from the outbound transmission path in response to the indication.

11. The method of claim 9, further comprising a step of:
   routing the spare outbound customer signal back to the spare processor.

12. The method of claim 9, further comprising a step of:
   routing the inbound customer signal to a monitoring port.

13. The method of claim 9, further comprising a step of:
   routing the spare outbound customer signal to a monitoring port.

14. The method of claim 9, further comprising a step of:
   routing the main outbound customer signal to a monitoring port.

15. The method of claim 9, further comprising a step of:
   isolating the inbound and outbound transmission paths.

* * * * *